Jan. 31, 1933.        L. J. A. TRUDEAU        1,895,826
BOLT AND APPLICATION THEREOF
Original Filed Jan. 20, 1930
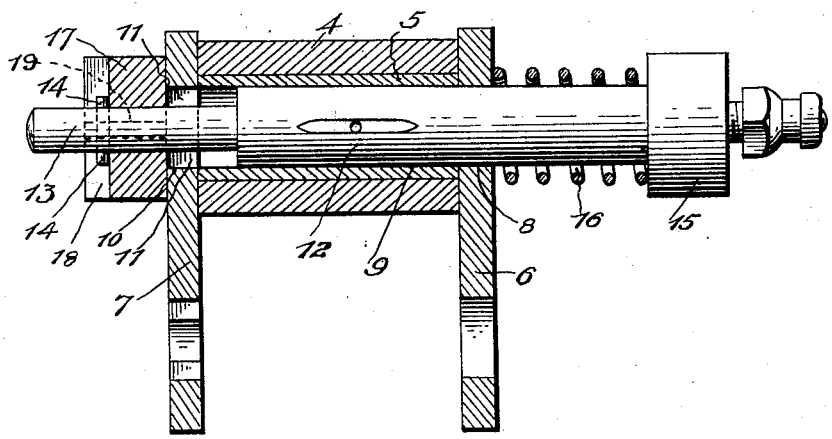
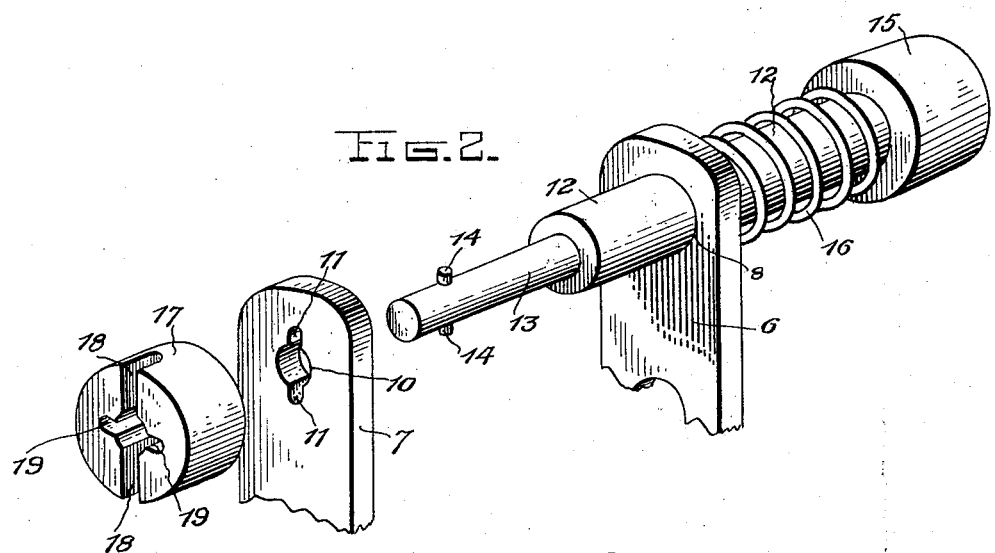
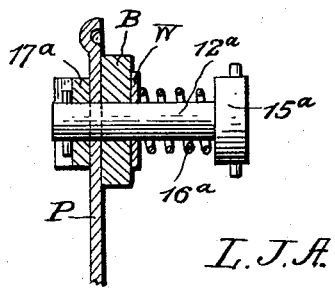
Inventor
L. J. A. Trudeau
By H. B. Willson & Co.
Attorneys
Witness
C. E. Hunt.

Patented Jan. 31, 1933

1,895,826

UNITED STATES PATENT OFFICE

LEONEL J. A. TRUDEAU, OF WALTHAM, MASSACHUSETTS

BOLT AND APPLICATION THEREOF

Application filed January 20, 1930, Serial No. 422,202. Renewed July 8, 1932.

The invention aims to provide a new and improved bolt construction possessing no screw threads and of such nature as to be quickly and easily applicable and removable and to effectively hold the parts through which it passes, against rattling.

Another object of the invention is to provide a unique assemblage of parts in which the improved bolt is used in connection with spring shackle links and a vehicle spring knuckle, acting both in the capacity of a pivot bolt and an anti-rattler and serving to compensate for wear.

With the foregoing in view, the invention resides in the novel subject matter hereinafter described and claimed, description being accomplished by reference to the accompanying drawing.

Fig. 1 is a vertical sectional view through a spring and shackle assembly of which the improved bolt forms a part.

Fig. 2 is a perspective view of a number of the parts shown in Fig. 1.

Fig. 3 is a sectional view showing a smaller form of the bolt used for securing an automobile identification tag or license plate to a bracket.

The applications of the bolt, above mentioned and illustrated in the drawing, are only two of many, and it is to be understood that the bolt as hereinafter claimed, may be used wherever it will be of advantage.

In the drawing above briefly described, the numeral 4 denotes a vehicle spring knuckle having the conventional bushing 5, 6 has reference to a shackle link abutting one end of the knuckle 4, and 7 denotes another shackle link contacting with the other end of said knuckle. The link 6 is formed with an opening 8 of the same diameter as the opening 9 through the bushing 5, whereas the link 7 is provided with a relatively small opening 10 having grooves 11 in its side wall and extending from the inner to the outer side of the link.

A bolt 12 passes through the opening 8 and is received in the opening 9 of the bushing 5, said bolt having a reduced end 13 passing through the opening 10 and provided with radially projecting studs 14 which are capable of passage through the grooves 11 and through the openings 9 and 8 when assembling or disassembling. The other end of the bolt 12 is provided with an integral head 15 spaced outwardly from the link 6, and interposed between said head and link, is a coiled compression spring 16.

A collar 17 is disposed on the reduced end 13 of the bolt 12 and contacts with the outer side of the link 7, said collar being provided with radial grooves 18 in which the studs 14 are held by the action of the spring 16. Collar 17 is also provided with two internal grooves 19 extending from its inner to its outer side, through which the studs 14 may pass.

The spring 16 thrusts is one direction upon the bolt head 15 and in the other direction upon the link 6, thereby tightly holding the parts 6, 4, 7 and 17 together and holding the studs 14 in the grooves 18. When it is desired to remove the bolt however, the collar 17 may be held, the bolt forced inwardly to a sufficient extent to allow the studs 14 to clear the grooves 18, the bolt then turned sufficiently to aline the studs 14 with the grooves 19, and the collar 17 then removed. This having been done, the bolt may be withdrawn, during which movement, the studs 14 will pass through the grooves 11 of the link 7 and may then pass on through the openings 9 and 8. Assembly may be accomplished with equal ease and rapidity and it will be observed that all parts will be so held as to prevent rattling and to effectively compensate for wear.

In the disclosure of Fig. 3 designed primarily for fastening an automobile identification or license plate P to a bracket B, the construction is about the same as above described, with the exception that the bolt 12$^a$ is provided with no reduced end. A spring 16$^a$ abuts the head 15$^a$ and the bracket B, or possibly a washer W disposed against this bracket, and a collar 17$^a$ which abuts the outer side of the plate P is connected with the bolt 12$^a$ in the same manner as collar 17 is connected with the bolt 12. In this application of the improved bolt, it effectively holds the license plate against rattling, permits quick and easy removal of one plate, and with equal facility, allows attachment of another plate.

I claim:

1. An assemblage of the class described comprising a spring knuckle and two shackle links contacting with opposite ends thereof, said knuckle and one of said links having openings of uniform diameter, the other link being formed with a relatively small opening having a groove in its wall extending from one side of the link to the other, a bolt snugly received in said openings of uniform diameter and having a reduced end passing through said relatively small opening, the other end of said bolt having an integral head spaced outwardly from said one link, a projecting stud on said reduced bolt end and adapted for passage through said groove and through said openings of uniform diameter, said stud being outwardly spaced from said other link, a collar on said reduced bolt end abutting the outer side of said other link and having a radial groove in its outer side in which said stud is seated, said collar being formed also with an internal groove from its inner to its outer side through which said stud may pass, and a coiled compression spring interposed between said one link and said head.

2. A shackle bolt having a reduced end provided with a radially projecting stud, the other end of said bolt having a head, a coiled compression spring surrounding said bolt and abutting said head, and a collar on said reduced bolt end, said collar having a radial groove in its outer side receiving said stud, said collar being formed also with an internal groove from its inner to its outer side through which said stud may pass.

In testimony whereof I have hereunto affixed my signature.

LEONEL J. A. TRUDEAU.